United States Patent [19]

Thibodeau

[11] Patent Number: 5,241,948
[45] Date of Patent: Sep. 7, 1993

[54] LEVELER FOR PORTABLE STOVES AND THE LIKE

[76] Inventor: Jean J. Thibodeau, P.O. Box 238, West Enfield, Me. 04493

[21] Appl. No.: 881,897
[22] Filed: May 12, 1992
[51] Int. Cl.$^5$ .................................................. A47J 37/00
[52] U.S. Cl. .............................. 126/25 R; 126/304 A; 126/305; 248/172
[58] Field of Search ............... 126/25 R, 9 R, 304 R, 126/304 A, 305, 306, 39, 30, 38, 41; 248/172, 495, 188.4, 439; 108/102, 143, 137

[56] References Cited

U.S. PATENT DOCUMENTS

| | | | |
|---|---|---|---|
| 2,749,071 | 6/1956 | Remstein | 248/172 |
| 2,805,776 | 9/1957 | Levitin | 248/172 |
| 3,880,139 | 4/1975 | Young | 126/9 R |
| 4,817,906 | 4/1989 | Ellison | 248/495 |
| 4,884,551 | 12/1989 | Hait | 126/9 R |

FOREIGN PATENT DOCUMENTS 3722396 10/1988 Fed. Rep. of Germany ... 126/304 A

Primary Examiner—James C. Yeung
Attorney, Agent, or Firm—Lorraine Donaldson

[57] ABSTRACT

A camp stove leveler having rail members forming a support surface and leg assemblies supporting and interconnecting the rail members in parallel spaced condition. Each leg assembly has at least two legs secured at opposite ends of a cross bar, each leg having an axially adjustable foot depending from its lower free end.

6 Claims, 1 Drawing Sheet

LEVELER FOR PORTABLE STOVES AND THE LIKE

BACKGROUND OF THE INVENTION

1. The Field of the Invention

The present invention relates to a device for providing a level base upon which a device, such as a portable stove, can be safely supported during cooking.

2. The Prior Art

Portable stoves, such as camp stoves, generally have closed rectangular housings containing one or more burner units supported beneath a grill upon which the cooking utensil rests. The fuel supply for the burners can either be internal, i.e. mounted within the housing or, more often, canisters either attached externally to the housing or placed nearby and connected to the burners by any one of several known means, such as flexible hoses. These stoves are most often used in an outdoors environment which, even when tables are available, usually is not sufficiently level to assure that the cooking grill surface can safely support food filled utensils during cooking of a meal. It is not satisfactory to use shims under one or more corners of the housing, in an attempt to level the stove, as this can be quite dangerous. Dislodgement of the shims could result in upset of the stove, which likely would have lit burners and hot food in the utensils on the grill.

The present invention has for an object to overcome this long felt need to provide an economical means to safely support a camp stove in a level condition, regardless of the irregularities of the available surface.

SUMMARY OF THE INVENTION

The present invention is a portable stove supporting and leveling apparatus having a frame with a pair of folding leg assemblies, each with a pair of legs, at each end of the frame. Each of the four legs is provided with individually adjustable legs. The frame itself is preferably adjustable in length and width so as to accommodate stoves of various sizes.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
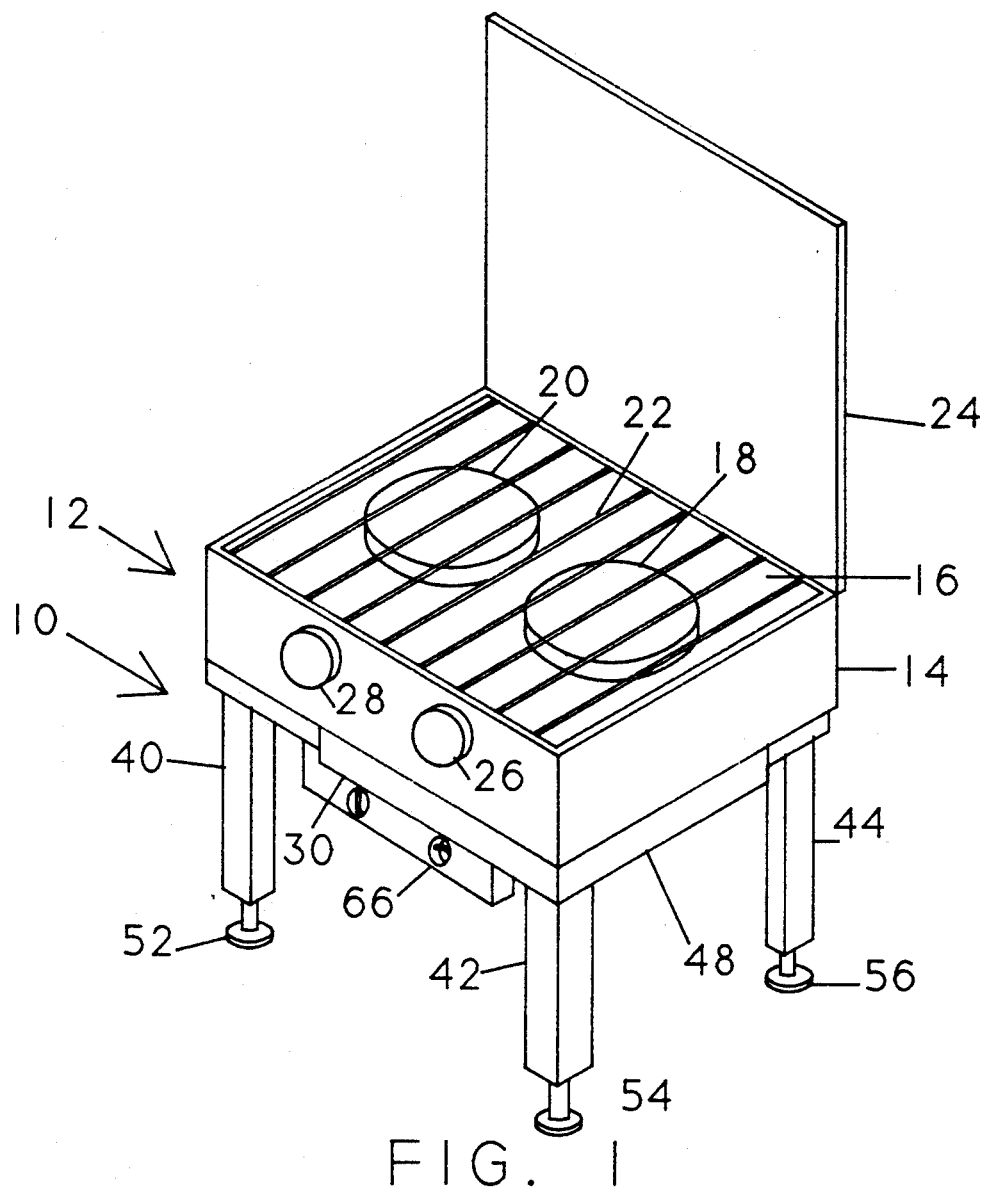
FIG. 1 is an isometric view of the subject invention supporting a camp stove.

The subject stove lever 10 is shown in FIG. 1 supporting a camp stove 12 which has a rectangular housing 14 defining a cavity 16 in which one or more burners 18, 20 are fixedly mounted. The stove has a grill 22, which is generally removable, positioned above the burners. The housing 14 is closed with cover 24 which can be held in an open condition, as shown, by known locking devices (not shown). The cover 24 may be provided with known side mounted wind shields (also not shown). Fuel for the burners comes from known containers (not shown), such a propane canister, which can be mounted either internally in or externally of the housing 14 and connected to the respective burners 18, 20 by known means (not shown), such as flexible hoses. Control means 26, 28 are shown mounted on the front of the stove to control, in known fashion, flow of fuel to the respective burners 18, 20 and thus the heat generated by them.

The subject leveler 10 has a pair of front and rear parallel spaced rails 30, 32. These rails 30, 32 are interconnected at their respective ends by leg assemblies 34, 36 to form a substantially rectangular unit. The leg assemblies 34, 36 each have legs 38, 40, 42, 44 joined by end bars 46, 48. The legs are each provided, on their lower ends, with axially adjustable feet 50, 52, 54, 56. The leg assemblies are pivotally attached, at the upper ends of their respective legs, to front and rear rails by pivot means 58, 60, 62, 64. These pivot means can be any of the well known pivotal fastening devices, such as rivets and bolts.

In the preferred embodiment of the subject invention, the rails 30, 32 and the end bars 46, 48 are made adjustable in length. This can be accomplished in a number of ways, for example by making the rails and bars telescoping or by having them overlapping and selectively joined. The choice of materials for forming these rails and bars will pretty much decide their manner of adjustability. For example, metal or plastics members would be most suitable for a telescoping assembly while wooden members would be more suitable for an overlapping configuration.

Figure 2:
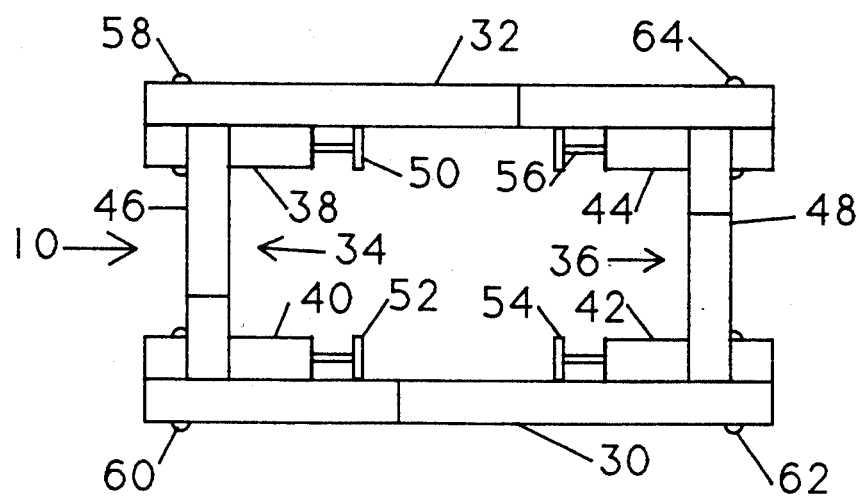
FIG. 2 is a top plan view of the subject device in a folded condition.

In order to use the present invention, first the rails and bars are set to the proper length to accommodate for the size of the stove to be supported thereon. Then the leg assemblies 34, 36 are rotated from the stored position of FIG. 2, wherein they lie substantially within the plane of the rails, to the set up position, wherein they extend substantially normal to the plane of the rails 30, 32, as shown in FIG. 1. It is within the scope of the present invention to provide means (not shown) to lock the leg assemblies in this position. Such means could include, but are not restricted to, detents, springs, catches, pins and the like.

After the leg assemblies 34, 36 are properly positioned, the feet 50, 52, 54, 56 are individually rotated, to move axially inwardly or outwardly with respect to that leg, until the unit achieves a level and non-rocking condition. Then the burners can be lit and cooking commenced with complete safety.

It is within the scope of the present invention to include means (not shown) to hold the stove in place thereon, such as corner anchors; to permanently attach the leveler to the stove's housing by screws, bolts or latches; or to store it with the stove by means of detachable straps to assure the stove and leveler will be together when needed. It is also within the scope of the invention to provide level 66 indicator means, such as a bubble level, to assure correct leveling of the stove.

The subject leveler can be manufactured from a variety of materials, including but not restricted to, wood, aluminum, steel and plastics.

The present invention may be subject to many modifications and changes without departing from the spirit or essential characteristics thereof. The present embodiment should therefor be considered in all respects as illustrative and not restrictive of the scope of the present invention as defined by the appended claims.

I claim:

1. A camp stove leveler comprising:
   front and rear parallel spaced rail members, each said rail member being adjustable in length; and a pair of leg assemblies spaced apart at opposite ends of and interconnecting said front and rear rail members, each said leg assembly having a cross bar with a pair of leg members secured at opposite ends thereof in parallel spaced condition extending normal to said cross bar, each said cross bar being adjustable in length, each said leg member having an axially adjustable foot depending therefrom; and means securing said leg assemblies to and between said front and rear rail members for relative rotation between a first position with said leg members extending normal to the plane of said rail members to a second position with said leg members lying substantially within the plane of said rail members.

2. A camp stove leveler according to claim 1 wherein said leveler is made of metal.

3. A camp stove leveler according to claim 1 wherein said leveler is made of wood.

4. A camp stove leveler according to claim 1 wherein said leveler is made of plastics material.

5. A camp stove leveler according to claim 1 further comprising:
   means to secure said leveler to a stove to be supported thereon.

6. A camp stove leveler according to claim 1 further comprising:
   means to indicate a level condition of said leveler.

* * * * *